(12) United States Patent
Lundh

(10) Patent No.: US 6,422,634 B2
(45) Date of Patent: Jul. 23, 2002

(54) STANDING BOARD FOR BUGGIES, PUSH-CHAIRS AND PRAMS

(76) Inventor: Jöran Lundh, Vistakulle, S-561 92, Huskvarna (SE)

( * ) Notice: Subject to any disclaimer, the term of this patent is extended or adjusted under 35 U.S.C. 154(b) by 0 days.

(21) Appl. No.: 09/771,576

(22) Filed: Jan. 30, 2001

Related U.S. Application Data

(63) Continuation of application No. PCT/SE98/01495, filed on Aug. 20, 1998.

(51) Int. Cl.[7] ............................. B62B 5/00; B62B 7/00; B62B 9/00
(52) U.S. Cl. .................................... 296/97.21; 280/32.7
(58) Field of Search ....................... 296/97.21; 280/32.7, 280/650

(56) References Cited

U.S. PATENT DOCUMENTS

| 765,846 | A | * | 7/1904 | Kiner |
| 5,887,935 | A | * | 3/1999 | Sack |
| 5,909,887 | A | * | 6/1999 | Hobrath |

FOREIGN PATENT DOCUMENTS

| DE | 97662 | 7/1897 |
| DE | 295 06 009 U 1 | 11/1995 |
| DE | 297 19 064 U1 | 1/1998 |
| DE | 297 22 147 U1 | 5/1998 |
| WO | WO 93/22179 | 11/1993 |

\* cited by examiner

*Primary Examiner*—Stephen T. Gordon
*Assistant Examiner*—Scott Carpenter
(74) *Attorney, Agent, or Firm*—Pillsbury Winthrop LLP

(57) ABSTRACT

The present invention is for standing boards that may be connected to buggies or prams which do not have a rear wheel shaft or otherwise are so designed that connecting of the standing board to the rear shaft is not always suitable. The standing board has a board, wheels at the rear end of the board, and mounting arms which connect the standing board to the buggy. The mounting arms are so designed that there is free space for the wheels of the buggy, possible breaking means etc., thus the mounting arms are curved so that they extend forwards and upwards from the board. The mounting of the arms at the standing board is such that the arms may take one out of several distinct positions relative to the board and when in use are fixedly arranged relative to the board. For this purpose the arms are fixed into bushings which in turn are fixed into mounting parts which preferably are integrated parts of the board of the standing board.

6 Claims, 3 Drawing Sheets

STANDING BOARD FOR BUGGIES, PUSHCHAIRS AND PRAMS

This application is a continuation of International Application No. PCT/SE98/01495 filed Aug. 20, 1998.

BACKGROUND OF THE INVENTION

1. Field of the Invention

The present invention is for standing boards for prams and buggies made that the standing board may be connected to prams and buggies which are without a rear shaft or are so designed that connecting the standing board to the rear shaft not always is suitable.

2. Description of Related Art

Standing boards for prams are intended to be connected to the pram to make it possible for brother and sisters or other older children to come along standing on the board. It is usually equipped to be connected to the rear shaft of the pram and the child stands between the carriage body and the handle of the pram. It is also possible to make use of the standing board for transportation of goods and similar purposes. The board is carried by a mounting at the rear shaft and by two wheels which are placed close to the rear end of the board. The wheels of the board are so arranged that they may turn around a vertical shaft However, some kinds of prams or buggies are so made that the board can not be connected to the wheel shaft, either because it is not within reach or because it is missing at carriages at which the wheels are mounted on short, individual shafts or shaft ends.

BRIEF SUMMARY OF THE INVENTION

The object of the present invention is a standing board which may be connected to a pram or buggy without making use of the rear wheel shaft of the pram or buggy. It is another object to obtain a connection which gives stability without risk that the carriage and the board will tilt over. A further object is to achieve a connection which may be adapted to various designs of the carriage.

BRIEF DESCRIPTION OF THE DRAWINGS

The present invention is further described in the detailed description which follows, by reference to the noted drawings by way of non-limiting exemplary embodiments, in which like reference numerals represent similar parts; throughout the several views of the drawings, and wherein.

DETAILED DESCRIPTION

Figure 1:
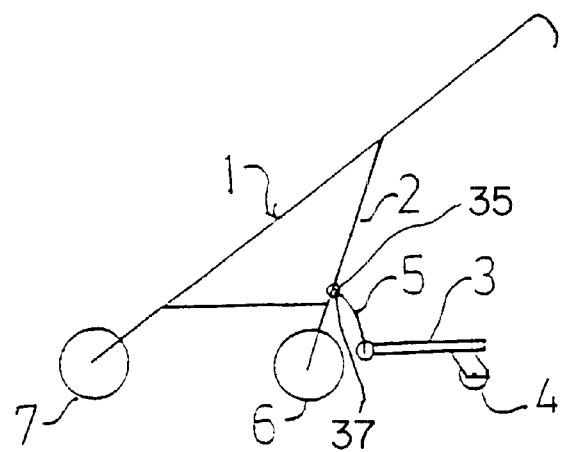
FIG. 1 shows a buggy with a standing board according to the invention.
Figure 2:
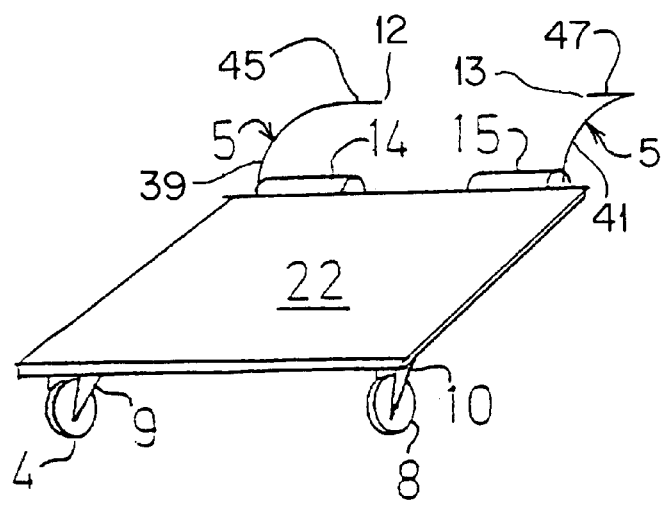
FIG. 2 shows a standing board according to the invention.
Figure 3:
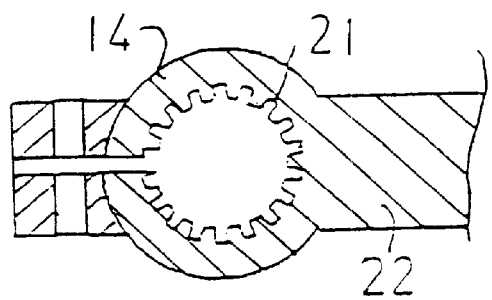
FIG. 3 shows a mounting bracket of the board.
Figure 4:
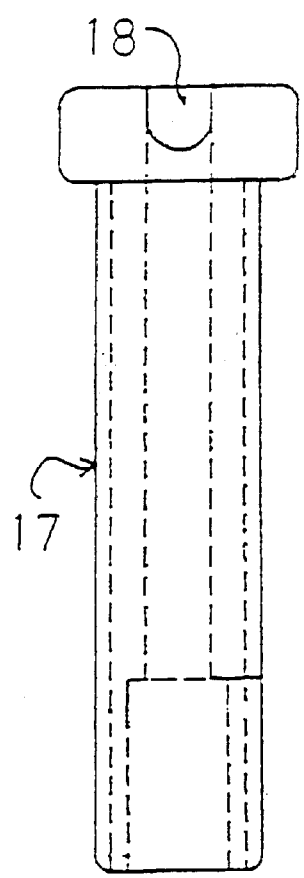
FIGS. 4 and 5 show a mounting bushing of the mounting device.
Figure 5:
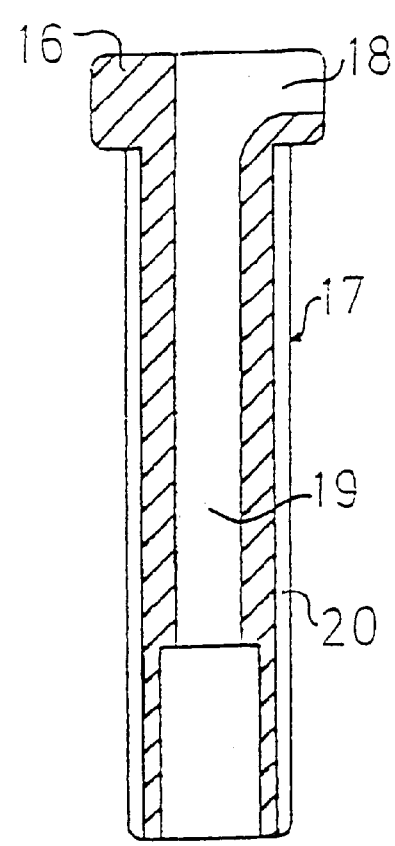

In the illustrated embodiment, a standing board 3 is shown mounted to a buggy 1 in FIG. 1. The buggy 1 is of a design such that, if the buggy includes a rear shaft, the standing board 3 is not readily mountable thereto. Therefore, the standing board 3 is mounted to the frame of the buggy 1. The standing board 3 may be mounted, for example, to a pair of rear members 2 of the frame. Each rear member 2 may be so designed to extend mainly straight from the handle of the buggy 1 down to the rear wheels 6. The buggy 1 may be of a foldable design without a common shaft for the rear wheels 6. The standing board 3 includes a board 22, wheels 4, 8 at the rear end of the board and two mounting arms 5, 11 which connect the board to the buggy. The wheels 4, 8 are carried by wheel forks 9, 10 which are pivotably mounted to the board 22. One end of each of the mounting arms 5, 11 is mounted to the standing board,22 and the other ends thereof are mounted to a corresponding rear member 2 of the buggy 1. The mounting arms 5, 11 are bent into circular bows 39, 41 and extend forwards and upwards from the board 22. With this configuration, there is free space between the mounting arms 5, 11 and the wheels 6 within which may be disposed heels of the buggy, breaking means, or other structural components. The mounting arms 5, 11, as seen in FIG. 2, include circular shaped parts 39, 41 (i.e., the portions bent to circular bows), a substantially horizontal shaft section 45, 47 extending from the upper ends of the circular shaped parts and which include shaft ends 12, 13, and substantially horizontal parts 23 extending from the lower ends of the circular shaped parts.

A pair of mounting mechanisms 35 are fixedly mounted, by any suitable manner, to the rear members 2 at an intermediate location thereof. Each mounting mechanism 35 may include a bore or a hole (neither shown) for receiving shaft ends 12 and 13 of mounting arms 5 and 11. The mounting arms 5, 11, and thus the board 22, can pivot about the axis 37 of the bore or hole of the mounting mechanism 35. It is also helpful for the board 22 and buggy 1 to pivot horizontally with respect to each other when, for example, the buggy passes over curbs and other bumps. Such horizontal pivoting is also helpful where the board 22 is loaded or exposed to short term downardly directed forces such that the board is tilted towards and is close to the buggy 1.

Figure 6:
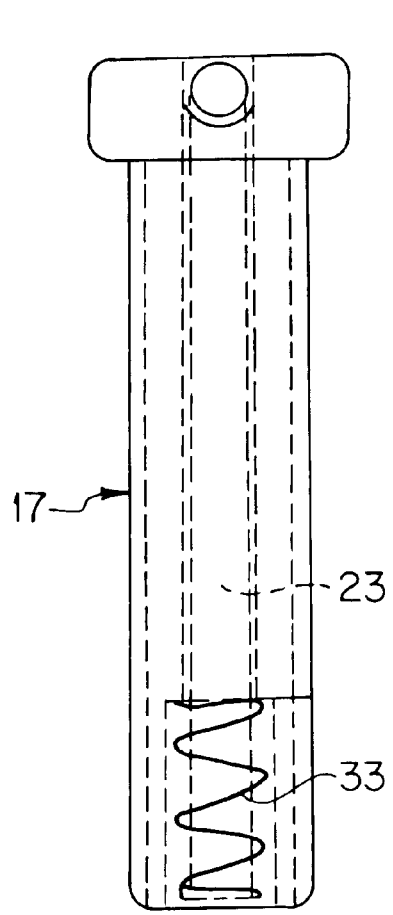
FIGS. 6 and 7 show the mounting bushing of FIGS. 4 and 5 with the mounting arm inserted therein.
Figure 7:
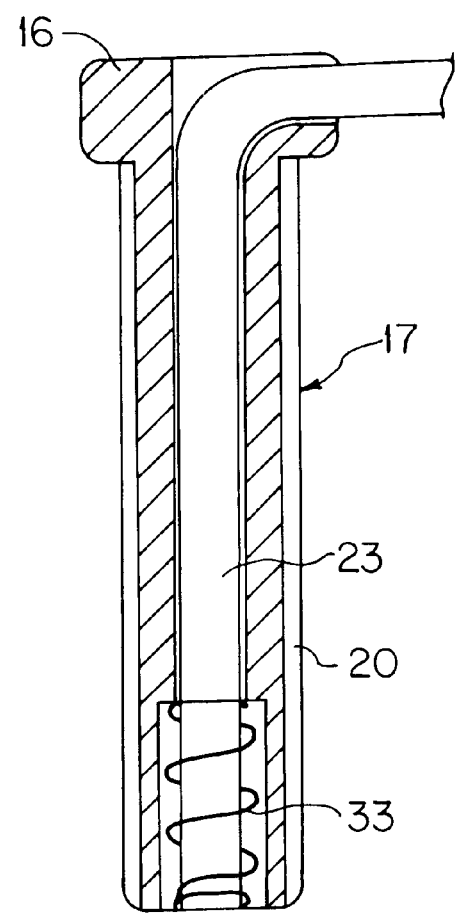

The mounting of the mounting arms 5 and 11 at the standing board 22 according to the invention is so made that the arms 5, 11 take one of several determined positions relative to the board and when in use are fixedly arranged relative to the board. For this purpose the mounting arms 5, 11 are mounted in "bushings" 17 which in turn are mounted in mounting devices 14, 15 which may be integrated parts of the standing board 22. The bushings 17 form a bore 19 for the insertion therein of the horizontal parts 23 of the mounting arms 5, 1 1, as seen in FIGS. 6 and 7. These horizontal parts 23 bend off at substantially right angles to the circular shaped parts 39, 41 of the mounting arms 5, 11 and are held at their fixed position at the bushing 17 by passing through the cut-out 18. Each mounting arm 5, 11 is resiliently mounted in the bushing 17 via of a spring 33 which is adapted at the outer end of each horizontal part 23 of the mounting arms 5, 11 and which forces the arm inwards into the bushing so that the mounting arm is kept in the cut-out 18. To release the standing board 22 from the buggy 1, the mounting arms 5, 11 may be pulled sidewise outwards so that the distance between the mounting arms is increased and the upper shaft ends 12, 13 are released from the mounting mechanism 35 at the buggy. The mounting arms 5, 11 may then be turned so that the shaft ends 12, 13 are in contact with the underside of the board 22 and the board, which is not in use, occupies as small space as possible.

The bushings 17 have a number of ridges 20 on an outer surface thereof and which may be evenly distributed around the circumference of the bushing. In the mounting devices 14, 15 at the standing board there is a hole corresponding to the bushing, the hole having grooves 21 corresponding to the ridges 20 on the outside of the bushing. The bushings 17 may be turned to a position such that the standing board 3 is substantially horizontal when the upper shaft ends 12, 13 of the mounting arms are inserted into the mounting mechanisms 35 which are mounted to the buggy 1. Since the bushings 17 are disposed within the hole and the engagement of the ridges 20 and grooves 21 prevent rotation of the bushings, the bushings are splined connectors. The bushings 17 may in a known manner be clamped thereby such that the mounting devices 14, 15 are slit and clamped around the inserted bushing. When the bushing 17 is correctly mounted its head 16, and groove 18, is at the outside of the mounting devices 14, 15 while the rest of the bushing is more or less pushed into the mounting devices 14, 15. In this way the distance between the mounting arms 5, 11 may be varied and adapted to the width of the buggy 1 with which the standing board 3 will be used.

Although described with reference to the illustrated embodiment above, other embodiments and uses are possible in accordance with the principles of the present invention. For example, the shape of the mounting arms 5, 11 may be adapted for various kinds of buggies and the mounting mechanisms 35 may be made in different ways. It is of course also possible to make and use of standing boards according to the invention with prams and buggies which have a rear wheel shaft and to mount the mounting mechanisms 35 for the mounting arms 5, 11 at this rear wheel shaft. Ridges and grooves at the bushings and the mounting parts of the standing board may also be varied, as well as the means for fixing of the bushings in the mounting parts.

What is claimed is:

1. A standing board for at least one of a buggy and a pram, said standing board comprising:

a board; and a pair of mounting arms each having an end thereof pivotally mounted to a mounting device that is connected to the board and an other end pivotably and detachably mounted to a mounting mechanism that is mounted to a frame of at least one of said buggy and said pram;

wherein each of said mounting devices includes a splined connector forming a bore which has inserted therein said end of said mounting arm, each of said mounting devices being constructed and arranged such that when the standing board is attached to said frame said mounting arms are fixedly arranged relative to the board.

2. The standing board according to claim 1, wherein the splined connector includes outside ridges which are inserted into corresponding grooves in the mounting devices in order to prevent rotation thereof.

3. The standing board according to claim 2, wherein each of said ends of the mounting arms are resiliently mounted within the bore of corresponding said splined connectors using a spring so that the mounting arms are biased toward each other and when pulled apart said other ends of the mounting arms are removed from said mounting mechanism at the frame to detach said board from said frame.

4. The standing board according to claim 2 or 3, wherein each mounting device includes means for mounting of the splined connectors at a variable distance from each other.

5. The detachable standing board according to claim 1, wherein said mounting arms extend upward from the board.

6. The detachable standing board according to claim 1, wherein said mounting arms extend forward from the board.

* * * * *